United States Patent [19]
Wallace

[11] 3,859,821
[45] Jan. 14, 1975

[54] FLEXIBLE COUPLING
[75] Inventor: Joseph E. Wallace, Creston, Iowa
[73] Assignee: Vanmark Corporation, Creston, Iowa
[22] Filed: Nov. 1, 1973
[21] Appl. No.: 411,722

Related U.S. Application Data
[63] Continuation of Ser. No. 265,362, June 22, 1972, abandoned.

[52] U.S. Cl. .................. 64/11 R, 64/14, 64/27 NM
[51] Int. Cl. ............................................. F16d 3/17
[58] Field of Search ............ 64/11 R, 14, 27 NM, 6, 64/27 R

[56] References Cited
UNITED STATES PATENTS

| | | | |
|---|---|---|---|
| 1,733,771 | 10/1929 | Baker | 64/27 NM |
| 2,160,611 | 5/1939 | Alexander | 64/27 NM |
| 2,363,469 | 11/1944 | Goldschmidt | 64/14 |
| 2,388,450 | 11/1945 | Thompson | 64/27 NM |
| 2,587,819 | 3/1952 | Camerino | 64/14 |
| 2,956,187 | 10/1960 | Wood | 64/11 R |
| 3,205,682 | 9/1965 | Porter | 64/14 |

Primary Examiner—Samuel Scott
Assistant Examiner—Randall Heald
Attorney, Agent, or Firm—Henderson & Strom

[57] ABSTRACT

A flexible coupling for transmitting power from a drive shaft to a driven shaft and including a main coupling member having a hub section for receiving and rotating with a first shaft, a flange section having a resilient insert therein, and a central non-circular opening in the insert adapted to receive and rotate with a second shaft having a cross-section mating with the opening in the insert.

9 Claims, 5 Drawing Figures

PATENTED JAN 14 1975  3,859,821

FLEXIBLE COUPLING

This is a continuation of application Ser. No. 265,362, filed June 22, 1972.

BACKGROUND OF THE INVENTION

There are many situations in the power transmission field wherein it is necessary or desirable to couple a drive shaft to a driven shaft with a coupling which will tolerate a limited amount of misalignment between the two shafts. Numerous flexible coupling devices have been developed for this purpose, as exemplified by U.S. Pat. Nos. 2,295,003; 2,587,819; 2,616,273; 2,629,991; 2,716,334 and 2,891,395.

In conventional flexible couplings, such as those described in the above-mentioned patents, it is customary to utilize a pair of opposed heads connected to opposed ends of a driving and driven shaft, with a resilient insert disposed between the faces of the opposed heads. The patents mentioned previously describe a number of variations of this basic concept.

While conventional flexible couplings are generally satisfactory in performance, nevertheless there is a need for an improved flexible coupling which is simple, effective, and which requires fewer parts than prior art couplings. Such an improved flexible coupling is provided by this invention.

SUMMARY OF THE INVENTION

The present invention relates to an improved flexible coupling for connecting a driving shaft to a driven shaft.

In accordance with this invention, a main coupling member having a hub section for receiving a first shaft and a flange section with a resilient insert having an opening therein for receiving a second shaft is provided. The main coupling member may be a unitary casting, for example, with a conventional keyway and set screw arrangement in the hub section for connecting to a first shaft. The flange section of the main coupling member forms a cavity for receiving and containing a resilient insert, and the insert has a central non-circular opening or bore therein adapted to receive and rotate with a second shaft having a cross-section mating with the central non-circular opening.

In operation, the hub section of the main coupling member is keyed or otherwise fixed to a first rotatable shaft, and a second rotatable shaft having a cross-section conforming to the opening in the resilient insert is inserted therein. Upon rotation of either of the shafts, the other shaft will rotate therewith. The resilient property of the insert enables a certain amount of misalignment of the two shafts to be tolerated, as with conventional flexible couplings.

It is an object of the invention to provide an improved flexible coupling which requires fewer parts than conventional flexible couplings.

It is a further object to provide an improved flexible coupling adapted to receive and rotate with a non-circular shaft.

That these and other objects and advantages are provided by the present invention will be apparent from the following detailed description of a preferred embodiment thereof.

DESCRIPTION OF A PREFERRED EMBODIMENT

Figure 1:
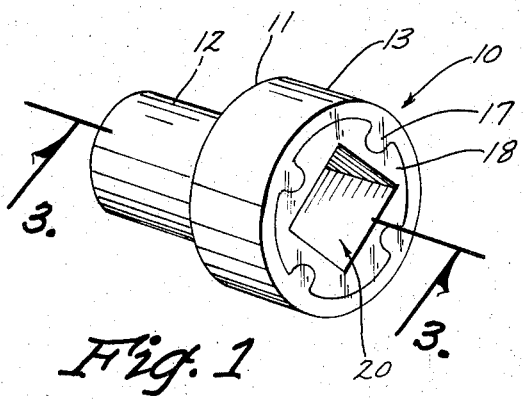
FIG. 1 is a perspective view showing a flexible coupling in accordance with the invention.

A preferred embodiment of the invention will be described by reference to the several views of the drawings. It will be apparent that the description is exemplary, and that many modifications and variations could be made without departing from the invention.

Referring to the drawings, a flexible coupling in accordance with a preferred embodiment of the invention is shown generally at 10. The coupling 10 includes a main coupling member 11 having a hub section 12 and a flange section 13. As seen best in FIG. 3, the main coupling member 11 is preferably of unitary construction, and may be an aluminum casting, for example. Obviously, the member 11 could be made from a wide range of materials. In instances where the coupling is used in food processing machinery, stainless steel is a preferred material.

Figure 3:
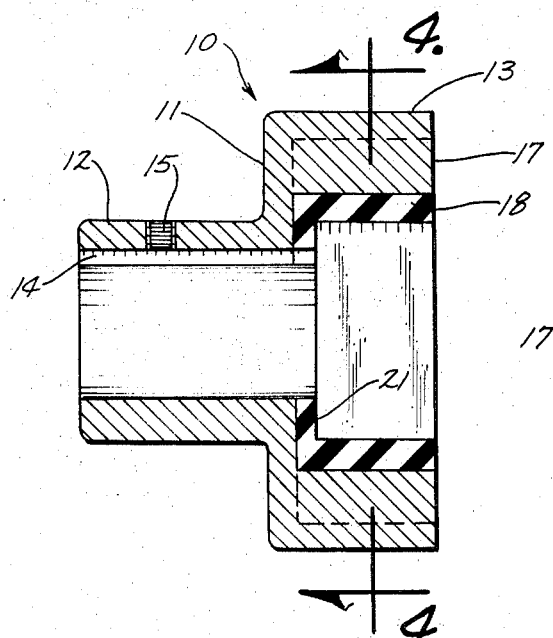
FIG. 3 is a cross-section taken along line 3—3 in FIG. 1.

The hub section 12, as best seen in FIG. 3, includes a key slot 14 extending longitudinally thereof as is conventional. A set screw 15 is provided for securing a key in place. Other conventional methods of connecting a shaft to the hub could obviously be utilized.

Figure 2:
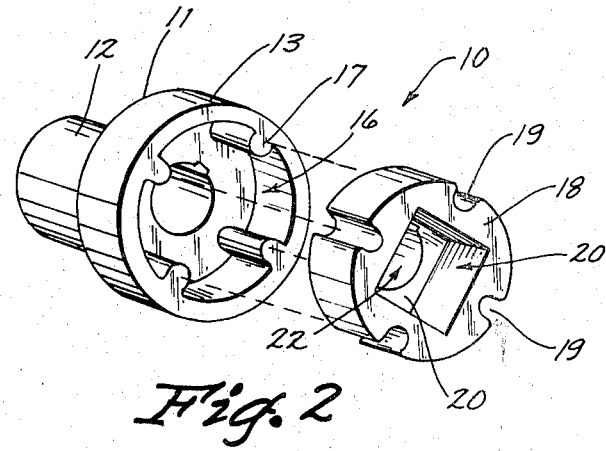
FIG. 2 is an exploded perspective view thereof.

The flange section 13 forms a cavity 16 (FIG. 2), and has a series of inwardly disposed lugs 17 spaced about the periphery of the flange section.

A resilient insert 18 fits within the cavity 16, and includes a series of channels 19 conforming to the shape of the lugs 17 of flange section 13. The insert preferably is formed from molded rubber having a Durometer hardness of about 90 ± 5 for general use. A softer material could be used to tolerate higher shock loads, or a harder material could be used to transmit higher radial loads, but as is well known these factors work in opposition to one another, and the particular hardness of material used may be a compromise between optimum shock and radial load requirements. Also, the hardness is related to the amount of misalignment that can be tolerated at a given speed of rotation.

Figure 4:
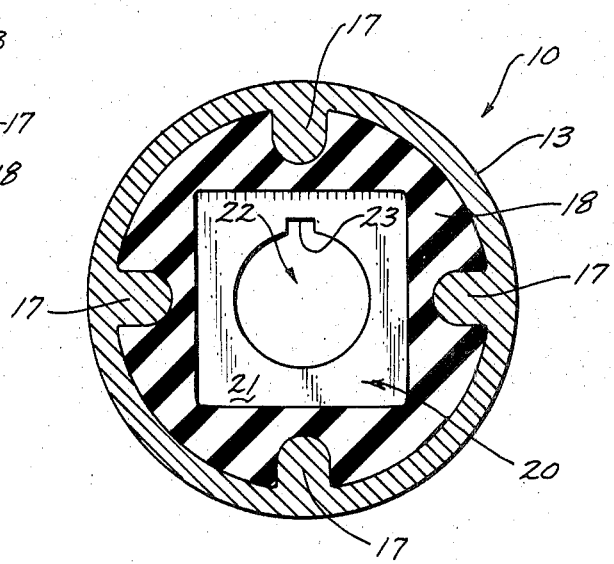
FIG. 4 is a cross-section taken along line 4—4 in FIG. 3.

A central opening or bore 20 is formed in the insert 18, illustrated in FIG. 4 as a square. The bore 20 extends substantially through the insert 18, but a back portion 21 is preferably left unbored for reasons to be explained below. A smalle circular opening 22 is shown through the back 21 of insert 18. This smaller opening 22 and the notch 23 are not functional in the operation of the coupling, but are the result of a preferred manner of holding and aligning the insert 18 during molding thereof.

The opening 20 in insert 18 is shown with a square cross-section. Any non-circular cross-section could be utilized, but a regular polygon having eight or fewer sides is preferred. The most efficient shape is an equilateral triangle, and the efficiency decreases as the number of sides increases. A cross-section having projections or indentations would obviously provide a similar function. A circular cross-section, however, would transmit no radial force except by friction, and would be unacceptable. A non-regular cross-section, such as a thin blade shape, could be utilized, but would not distribute the radial loads uniformly and therefore would tend to wear the insert at areas of concentrated load.

The insert 18 is preferably bonded to the surface of the cavity 16 in any known manner.

Figure 5:
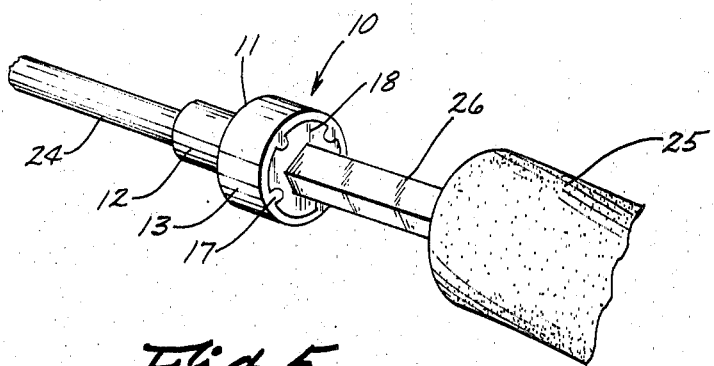
FIG. 5 is a perspective view showing two shafts flexibly coupled by the device of the invention.

The operation of the coupling 10 is quite apparent from the above description, but will be described in connection with one manner of utilizing it. In FIG. 5, a drive shaft 24 is shown extending into hub section 12 for rotation therewith. The drive shaft 24 might be, for example, one of a series of drive shafts turning a series of abrasive rollers in a vegetable peeling machine (not shown). A portion of an abrasive roller 25 is shown in FIG. 5 with a square shaft 26 extending therefrom. The shaft 26 mates with the bore or opening 20 in insert 18, preferably all the way to the back 21 thereof. The back 21 of insert 18 thus serves to position the square shaft 26, and also provides a flexible surface against the end of square shaft 26 to accommodate misalignment of the drive shaft 24 and square shaft 26. The flexible coupling also allows the abrasive roller 25 and square shaft 26 to be removed from a machine (not shown) by lifting the end of the roller 25 opposite the coupling 10 out of a well known type of supporting seat or housing (not shown) and then pulling the roller 25 and square shaft 26 away from coupling 10. It is due to the resilient nature of rubber insert 18 that the roller 25 can be lifted and the shaft 26 thereby pulled or slid out of opening 20.

The coupling 10 of this invention has general utility in any situation where first and second shafts are to be flexibly coupled. One of the shafts need only have an end with a non-circular cross-section. The entire length of the shaft need not have a non-circular cross-section, but only that part positioned within the opening 20 of insert 16. Obviously, a non-circular cap or tip could be attached to or formed on a round shaft and thereby make the shaft usable with the coupling of this invention.

The above detailed description of a preferred embodiment of the invention is intended to illustrate the invention, and not to limit the same, reference being had to the appended claims for the latter purpose.

I claim:

1. A flexible drive coupling for transmitting power from a drive shaft to a driven shaft comprising:
    a main coupling member;
    a hub section forming a part of the main coupling member and adapted to receive and rotate with a first shaft;
    a flange section forming a part of the main coupling member and being adapted to receive a shaped insert therein;
    a shaped torque-transmitting insert formed of a resilient material disposed within the flange section of the main coupling member, the insert having a central non-circular shaft-receiving opening;
    a non-circular second shaft having one end thereof received in a mating relationship inside said opening;
    support means on the other end of said second shaft for rotatably mounting the second shaft and thereby holding the said one end of the second shaft into the opening; and
    means for permitting said other end of said second shaft to be lifted from said support means whereby said one end of the second shaft may be slid out of said opening to thereby effect an uncoupling of the drive coupling and the second shaft.

2. A flexible drive coupling as defined in claim 1 wherein the flange section has a plurality of inwardly directed insert engaging lugs thereon.

3. A flexible drive coupling as defined in claim 1 wherein the insert is bonded to the interior of the flange section.

4. A flexible drive coupling as defined in claim 1 wherein the insert has a partial back wall section.

5. A flexible drive coupling as defined in claim 1 wherein the shaft-receiving opening formed in the insert is a regular polygon in cross-section.

6. A flexible drive coupling as defined in claim 1 wherein the shaft-receiving opening formed in the insert is a square in cross-section, and the insert is formed of rubber having a Durometer hardness of about 90.

7. A flexible drive coupling as defined in claim 1 wherein the hub section and the flange section are parts of a unitary structure.

8. A flexible drive coupling as defined in claim 1 wherein said first shaft is the drive shaft and the second shaft is the driven shaft.

9. A flexible drive coupling for transmitting power from a drive shaft to a driven shaft comprising:
    a main coupling member;
    a hub section forming a part of the main coupling member and adapted to receive and rotate with a first shaft;
    a flange section forming a part of the main coupling member and being adapted to receive a shaped insert therein;
    a shaped torque-transmitting insert formed of a resilient material disposed within the flange section of the main coupling member, the insert having a central non-circular shaft-receiving opening;
    a non-circular second shaft having one end thereof received in a mating relationship inside said opening;
    said second shaft being rotatable with said drive coupling and having an opposite end adapted to be lifted, whereby upon being lifted the second shaft can be slid from said opening to uncouple the second shaft from the drive coupling.

* * * * *